US006798951B2

(12) United States Patent
Fabiny

(10) Patent No.: US 6,798,951 B2
(45) Date of Patent: Sep. 28, 2004

(54) WAVELENGTH ROUTER WITH A TRANSMISSIVE DISPERSIVE ELEMENT

(75) Inventor: Larry Fabiny, Boulder, CO (US)

(73) Assignee: PTS Corporation, San Jose, CA (US)

( * ) Notice: Subject to any disclaimer, the term of this patent is extended or adjusted under 35 U.S.C. 154(b) by 339 days.

(21) Appl. No.: 09/992,087

(22) Filed: Nov. 12, 2001

(65) Prior Publication Data

US 2003/0095743 A1 May 22, 2003

(51) Int. Cl.⁷ .............................. G02B 6/34; H04J 14/00
(52) U.S. Cl. ............................. 385/37; 385/24; 385/36; 398/48; 398/49; 398/55; 398/57; 398/87
(58) Field of Search .............................. 385/37, 24, 36, 385/11, 42, 33, 43, 44, 45, 46, 31; 398/49, 48, 55, 57, 84, 86, 87, 118

(56) References Cited

U.S. PATENT DOCUMENTS

| | | | |
|---|---|---|---|
| 5,212,582 A | 5/1993 | Nelson ........................ | 359/224 |
| 5,279,924 A | 1/1994 | Sakai et al. .................... | 430/290 |
| 5,414,540 A | 5/1995 | Patel et al. .................... | 359/39 |
| 5,917,625 A | 6/1999 | Ogusu et al. ................. | 359/130 |
| 5,960,133 A | 9/1999 | Tomlinson .................... | 385/18 |
| 5,978,116 A * | 11/1999 | Wu et al. ....................... | 398/49 |
| 5,999,672 A | 12/1999 | Hunter et al. .................. | 385/37 |
| 6,097,519 A | 8/2000 | Ford et al. .................... | 359/130 |
| 6,097,859 A | 8/2000 | Solgaard et al. .............. | 385/17 |
| 6,097,863 A | 8/2000 | Chowdhury ................... | 385/37 |
| 6,108,471 A | 8/2000 | Zhang et al. .................. | 385/37 |
| 6,288,807 B1 * | 9/2001 | Wu et al. ....................... | 398/9 |
| 6,529,307 B1 | 3/2003 | Peng et al. ................ | 398/81 X |
| 6,556,297 B1 * | 4/2003 | Cappiello .................... | 356/328 |
| 6,594,082 B1 * | 7/2003 | Li et al. ....................... | 359/618 |
| 2003/0128917 A1 * | 7/2003 | Turpin et al. .................. | 385/24 |

OTHER PUBLICATIONS

Ford, Joseph E., et al., "Wavelength Add–Drop Switching Using Tilting Micromirrors," Journal of Lightwave Technology, vol. 17, No. 5, May 1999.

Grade, John D., et al., "A Large–Deflection Electrostatic Actuator for Optical Switching Applications," Solid–State Sensor and Actuator Workshop, Hilton Head Island, South Carolina, Jun. 4–8, 2000.

Graf, U.U., et al., "Fabrication and evaluation of an etched infrared diffraction grating," Applied Optics, vol. 33, No. 1, Jan. 1994.

Keller, Luke D., et al., "Fabrication and testing of chemically micromachined silicon echelle gratings," Applied Optics, vol. 39, No. 7, Mar. 2000.

Nishi, I., et al., "Broad–Passband–Width Optical Filter for Multi/Demultiplexer Using a Diffraction Grating and a Retroreflector Prism," Electronics Letters, vol. 21, No. 10, May 9, 1985.

(List continued on next page.)

Primary Examiner—Brian M. Healy
(74) Attorney, Agent, or Firm—Townsend and Townsend and Crew LLP

(57) ABSTRACT

A wavelength router is provided that selectively directs spectral bands between an input port and a set of output ports. The router includes a free-space optical train disposed between the input port and the output ports. The free-space optical train may include air-spaced elements or may be of generally monolithic construction. The optical train includes a transmissive dispersive element, such as a transmissive diffraction grating, disposed so that light is intercepted from the input port and encounters the transmissive dispersive element at least four times before reaching any of the output ports.

32 Claims, 5 Drawing Sheets

OTHER PUBLICATIONS

Philippe, P., et al., "Wavelength demultiplexer: using echelette gratings on silicon substrate," Applied Optics, vol. 24, No. 7, Apr. 1, 1985.

Rallison, R.D., et al., "Dense Wavelength Division Multiplexing (DWDM) and the Dickson Grating," White Paper, Jan. 6, 2001.

Shams, Mohammad Kazem, et al., "Preferential chemical etching of blazed gratings in (110)–oriented GaAs," Optics Letters, vol. 4, No. 3, Mar. 1979.

Smith, M.S.D., et al., "Diffraction ratings Utilizing Total Internal Reflection Facets in Litirow Configuration,"IEEE Photonics Technology Letters, vol. 11, No. 1, Jan. 1999.

Sun, Z. J., et al., "Demultiplexer with 120 Channels and 0.29–nm Channel Spacing," IEEE Phototonics Technology Letters, vol. 10, No. 1, Jan. 1998.

Loewen, Erwin G., et al., "Diffraction Gratings and Applications," Marcel Dekker, Inc. 1997, pp. 132–136, 300–301.

* cited by examiner

WAVELENGTH ROUTER WITH A TRANSMISSIVE DISPERSIVE ELEMENT

CROSS-REFERENCES TO RELATED APPLICATIONS

This application is related to copending, commonly assigned U.S. patent application Ser. No. 09/442,061 ("the '061 application"), entitled "Wavelength Router," filed Nov. 16, 1999 by Robert T. Weverka et al., which is herein incorporated by reference in its entirety, including the Appendix, for all purposes.

BACKGROUND OF THE INVENTION

This application relates generally to fiber-optic communications and more specifically to techniques and devices for routing different spectral bands of an optical beam to different output ports (or conversely, routing different spectral bands at the output ports to the input port).

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In order to perform wavelength routing functions optically today, the light stream must first be de-multiplexed or filtered into its many individual wavelengths, each on an individual optical fiber. Then each individual wavelength must be directed toward its target fiber using a large array of optical switches commonly called as optical cross-connect (OXC). Finally, all of the wavelengths must be re-multiplexed before continuing on through the destination fiber. This compound process is complex, very expensive, decreases system reliability and complicates system management. The OXC in particular is a technical challenge. A typical 40–80 channel DWDM system will require thousands of switches to fully cross-connect all the wavelengths. Opto-mechanical switches, which offer acceptable optical specifications are too big, expensive and unreliable for widespread deployment. New integrated solid-state technologies based on new materials are being researched, but are still far from commercial application.

Consequently, the industry is aggressively searching for an all-optical-wavelength routing solution which enables cost-effective and reliable implementation of high-wavelength-count systems.

BRIEF SUMMARY OF THE INVENTION

The present invention provides a wavelength router that allows flexible and effective routing of spectral bands between an input port and a set of output ports (reversibly, also between the output ports and the input port).

An embodiment of the invention includes a free-space optical train disposed between the input port and the output ports. The free-space optical train may include air-spaced elements or may be of generally monolithic construction. The optical train includes a transmissive dispersive element, such as a transmissive diffraction grating, disposed so that light is intercepted from the input port and encounters the transmissive dispersive element at least four times before reaching any of the output ports. Certain embodiments also include a routing mechanism having at least one dynamically configurable routing element, which cooperates with elements in the optical train to provide optical paths that couple desired subsets of the spectral bands to desired output ports. The routing elements are disposed to intercept the different spectral bands after they have been spatially separated by the transmissive dispersive element.

In certain embodiments, the transmissive dispersive element is encountered by light in pairs, with a reflective surface being disposed to reflect light immediately back towards the transmissive dispersive element after it has propagated through the transmissive dispersive element. The reflective surface and the transmissive dispersive element may be oriented with respect to an optical axis of the wavelength router so that each encounter with the transmissive dispersive element is near the Littrow condition. The reflective surface may be flat, although in other embodiments it comprises optical power. In a specific embodiment, the transmissive dispersive element and the reflective surface are comprised by an integrated element.

The invention includes dynamic switching embodiments and static embodiments. In dynamic embodiments, the routing mechanism includes one or more routing elements whose state may be dynamically changed in the field to effect switching. In static embodiments, the routing elements are configured at the time of manufacture or under circumstances where the configuration is intended to remain unchanged during prolonged periods of normal operation.

In the most general case, any subset of the spectral bands, including the subset that consists of no spectral bands and including the subset that consists of the whole set of spectral bands, can be directed to any of the output ports. However, there is no requirement that the invention be able to provide every possible routing. Further, in general, there is no constraint on whether the number of spectral bands is greater or less than the number of output ports.

In some embodiments, the routing mechanism includes one or more retroreflectors, each disposed to intercept a respective one of the spectral bands after twice encountering the transmissive dispersive element, and direct the light in the opposite direction with a controllable transverse offset. In other embodiments, the routing mechanism includes one or more tiltable micromirrors, each of which can redirect one of the spectral bands with a controllable angular offset. There are a number of ways to implement the retroreflectors.

In some embodiments, the beam is collimated before encountering the transmissive dispersive element, so as to result in each spectral band leaving after twice encountering the dispersive element as a collimated beam traveling at an angle that varies with its wavelength. The dispersed beams are then refocused onto respective routing elements and directed back so as to encounter the same elements in the optical train and to encounter the transmissive dispersive element twice before exiting the output ports as determined by the disposition of the respective routing elements. Some embodiments of the invention use cylindrical lenses while others use spherical lenses.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

1. Introduction

Figure 1A:
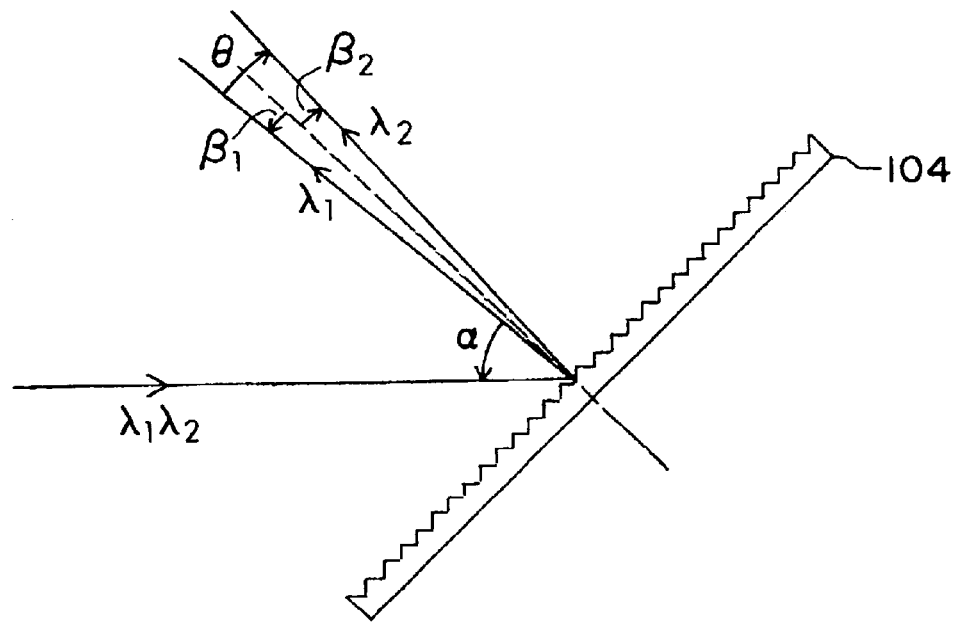
FIG. 1A provides a schematic illustration of the operation of a reflective diffraction grating.

The following description sets forth embodiments of an all-optical wavelength router according to the invention. Embodiments of the invention can be applied to network elements such as optical add-drop multiplexers (OADMs) and wavelength-selective cross-connects (WSXCs) to achieve the goals of optical networking systems.

The general functionality of the wavelength router is to accept light having a plurality of (say N) spectral bands at an input port, and selectively direct subsets of the spectral bands to desired ones of a plurality of (say M) output ports. Most of the discussion will be with reference to dynamic (switching) embodiments where the routing mechanism includes one or more routing elements whose state can be dynamically changed in the field to effect switching. The invention also includes static embodiments in which the routing elements are configured at the time of manufacture or under circumstances where the configuration is intended to remain unchanged during prolonged periods of normal operation.

The embodiments of the invention include a dispersive element, such as a diffraction grating or a prism, which operates to deflect incoming light by a wavelength-dependent amount. Different portions of the deflected light are intercepted by different routing elements. Although the incoming light could have a continuous spectrum, adjacent segments of which could be considered different spectral bands, it is generally contemplated that the spectrum of the incoming light will have a plurality of spaced bands.

The terms "input port" and "output port" are intended to have broad meanings. At the broadest, a port is defined by a point where light enters or leaves the system. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components. Most of the embodiments contemplate that light will diverge as it enters the wavelength router after passing through the input port, and will be converging within the wavelength router as it approaches the output port. However, this is not necessary.

The International Telecommunications Union (ITU) has defined a standard wavelength grid having a frequency band centered at 193,100 GHz, and another band at every 100 GHz interval around 193,100 GHz. This corresponds to a wavelength spacing of approximately 0.8 nm around a center wavelength of approximately 1550 nm, it being understood that the grid is uniform in frequency and only approximately uniform in wavelength. Embodiments of the invention are preferably designed for the ITU grid, but finer frequency intervals of 25 GHz and 50 GHz (corresponding to wavelength spacings of approximately 0.2 nm and 0.4 nm) are also of interest.

2. Diffraction of Optical Signals

The size of a wavelength router that meets the ITU standards is constrained physically by two principal considerations—the rate at which a beam may be dispersed when propagated longitudinally within the wavelength router and the transverse separation that may be achieved with elements disposed to intercept a portion of the beam. The size of the wavelength router may generally be decreased either by increasing the rate at which the beam disperses during longitudinal propagation or by decreasing the transverse separation of the intercepting elements. Embodiments of the invention permit such a decrease in size by providing an increased dispersion rate for the beam.

The dispersive element acts to demultiplex an optical signal that contains a plurality of signals at different wavelengths. The operation of a dispersive element is illustrated in FIG. 1A with the example of a reflective diffraction grating 104. When illuminated at an angle $\alpha$ from its normal, the reflective diffraction grating 104 directs light with wavelength λ towards angle β, also with respect to the normal, in accordance with the grating equation, $$m\lambda = d(\sin \alpha \pm \sin \beta),$$

where m is an integral order of interference and d is the grating period. FIG. 1A shows schematically the result when a multiplexed signal comprising wavelengths $\lambda_1$, and $\lambda_2$ is incident on the reflective diffraction grating 104 at angle α. Signals corresponding to the independent wavelengths are reflected respectively at different angles $\beta_1$ and $\beta_2$ from the grating 104. The dispersion between the two reflected signals is defined by the angular separation $\theta \equiv |\beta_2 - \beta_1|$ between them.

The geometry of the reflective diffraction grating 104 imposes a physical limitation on the dispersion. According to the grating equation, the diffraction angle β is approximately inversely related to the grating period d so that, in general, the dispersion θ increases with the line density of the grating. The line density, however, may not be increased so as to be arbitrarily large and still maintain certain desirable functional qualities of the diffraction. The upper limit on line density may be understood by considering the diffraction equation near the Littrow condition, in which incident and diffracted rays are autocollimated so that $\alpha = \beta \equiv \Phi$. Under these circumstances, the diffraction equation takes the simple form $$\sin\varphi = \frac{m\lambda}{2d}.$$

Since the sine function is a bounded function, the line density is constrained in first order m=1 so that $$\frac{1}{d} \le \frac{2}{\lambda},$$

providing a maximum line density at λ 1550 nm in of about 1290 lines/mm.

Figure 1B:
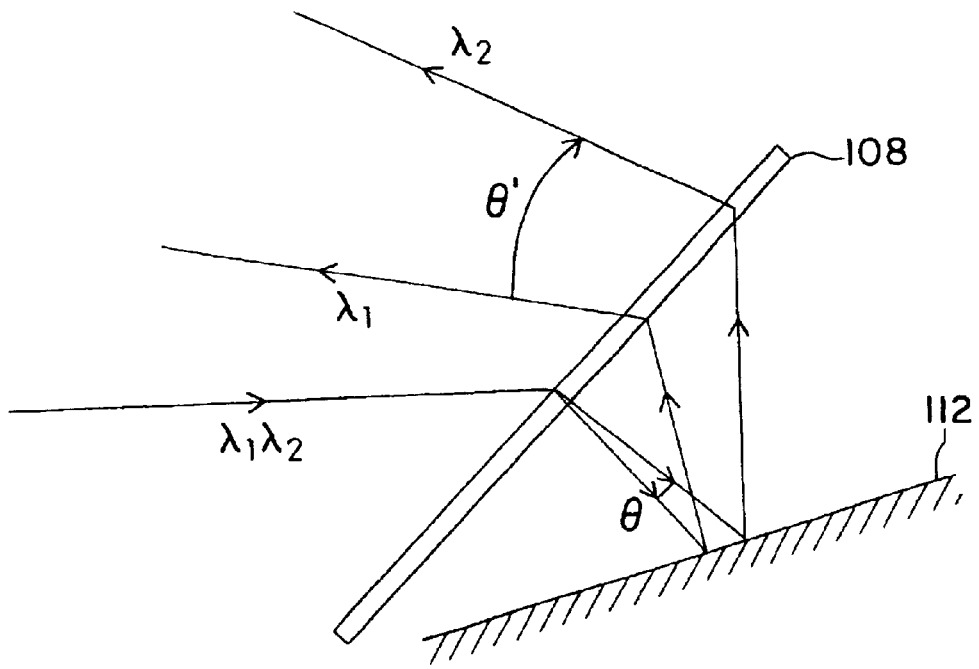
FIG. 1B provides a schematic illustration of the combined operation of a transmissive diffraction grating and reflective surface.

Embodiments of the invention thus use a combination of a transmissive dispersive element and a reflective surface to avoid the physical constraint on dispersion provided by a reflective dispersive element. This is exemplified in FIG. 1B, in which a transmissive diffraction grating 108 is disposed at an angle with respect to a flat reflective surface 112. A multiplexed signal comprising wavelengths $\lambda_1$ and $\lambda_2$ is transmissively diffracted with a dispersion that separates the signals by angle θ, provided the grating 108 has the same grating period as the reflective grating 104 in FIG. 1A and the multiplexed signal is incident at the same angle. With the arrangement shown in FIG. 1B, however, the dispersed signals are reflected from the reflective surface 112 and diffracted again through the transmissive diffraction grating 108, causing an increase in dispersion. After passing through the transmissive diffraction grating 108 twice, the $\lambda_1$ and $\lambda_2$ signals are dispersed by separation angle θ'. The relationship between θ and θ' depends, in general, on the properties of the transmissive diffraction grating 108 and the orientation of the reflective surface 112, but generally θ'>θ so that as the signals propagate within a wavelength router their dispersion is increased relative to that provided by the arrangement of FIG. 1A. For the specific orientations discussed in more detail below, θ'≈2θ. It is noted that reflective surface 112, while shown as a flat surface, may alternatively be curved.

3. Embodiments Using Spherical Focusing Elements

Figure 2A:
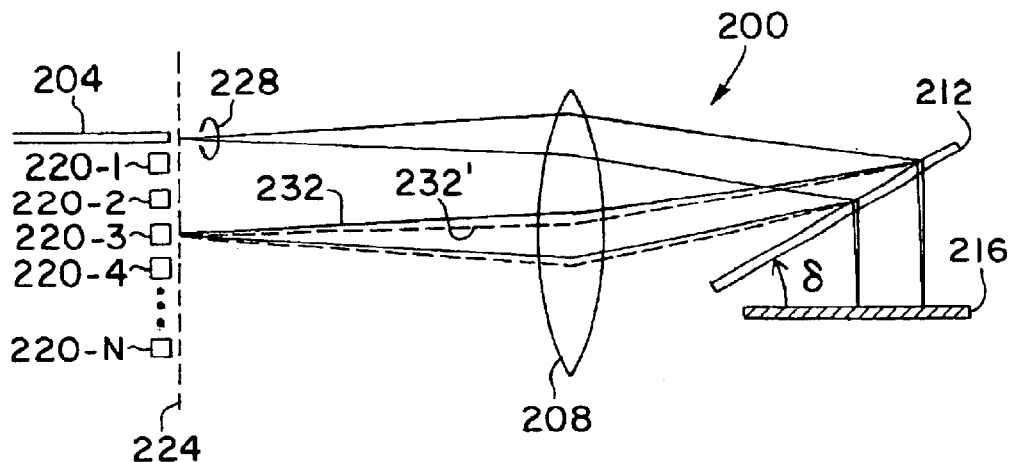
FIGS. 2A, 2B, and 2C provide schematic top, side, and end views, respectively, of a wavelength router according to an embodiment of the invention that uses spherical focusing elements.
Figure 2B:
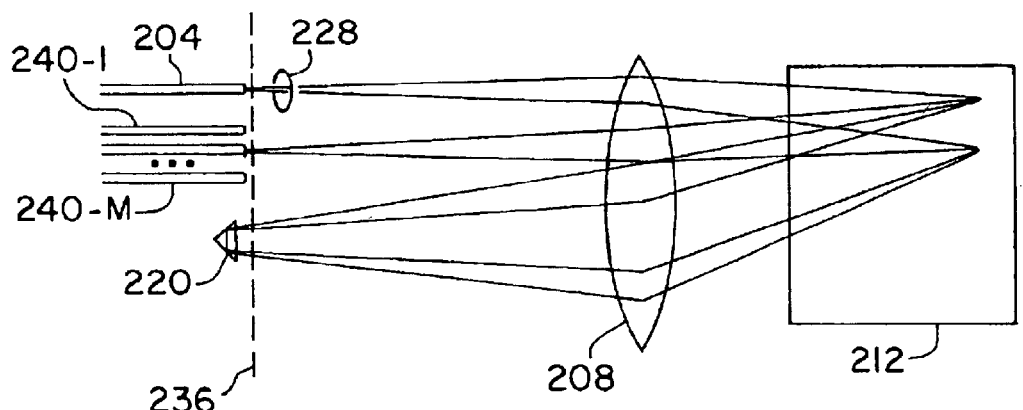
Figure 2C:
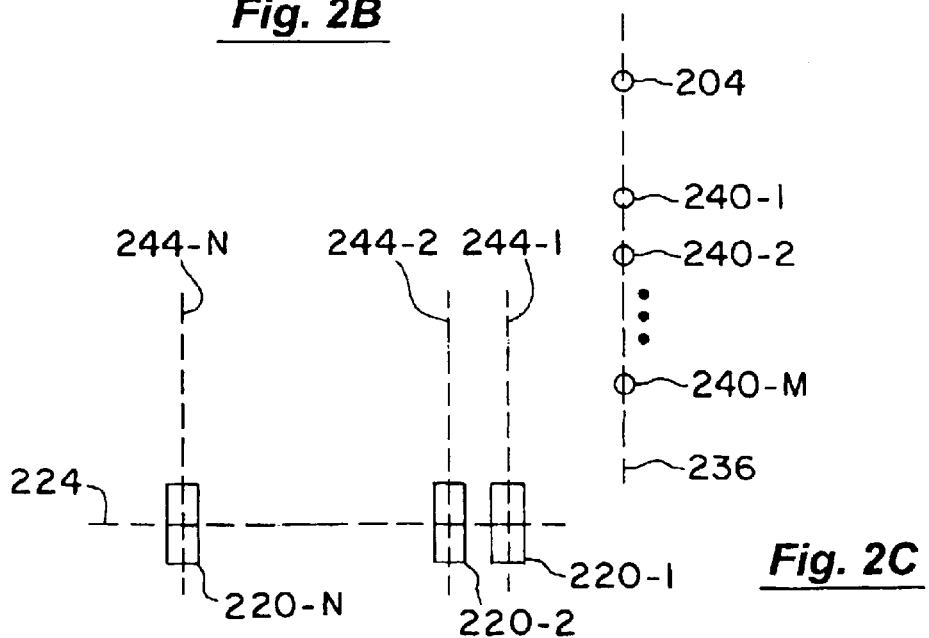

FIGS. 2A, 2B, and 2C are schematic top, side, and end views, respectively, of a wavelength router 200 according to an embodiment of the invention. The general functionality of the wavelength router 200 is to accept light having a plurality of (say N) spectral bands at an input port 204, and selectively to direct subsets of the spectral bands to desired ones of a plurality of (say M) output ports 240. The output ports 240 are shown in the end view of FIG. 2C as disposed along a line 236 that extends generally perpendicular to the top view of FIG. 2A. The input port 204 and the output ports 240 are shown as communicating with respective input and output optical fibers, but it should be understood that the input port 204 could also receive light directly from a light source, and the output ports 240 could be coupled directly to optical detectors. The drawings are not to scale, and in some instances the diffraction by certain optical elements is exaggerated for illustrative purposes; generally, beams will propagate approximately parallel to the optical axis of the wavelength router 200.

Light entering the wavelength router 200 from the input port 204 forms a diverging beam 228, which includes the different spectral bands. The beam 228 encounters a lens 208, which collimates the light and directs it to a transmissive diffraction grating 212. The transmissive diffraction grating 212 diffracts the light so that it is reflected from a reflective surface 216 back through the grating 212, where it is further dispersed as described above.

In one embodiment, the grating 212 and the reflective surface 216 are oriented with respect to each other at an angle δ that is approximately 45° and the system is configured for near-Littrow behavior. Under the Littrow condition in first order with α=45°, the line density of the grating is given by $$\frac{1}{d} = \frac{\sqrt{2}}{\lambda},$$

so that at λ 1550 nm, the line density of the grating 212 is of the order of 900 lines/mm. In this configuration, then, when the beam 228 is incident near the Littrow angle α=45°, it is diffracted substantially normal to the reflective surface 216 so that it is also incident near the Littrow angle α=45° when it encounters the grating 212 for the second time. After the two encounters with the grating, the effective dispersion achieved by this arrangement is approximately 2.4 radians/μm. This dispersion is approximately twice as large as the corresponding dispersion provided by a reflective grating having a line density 1/d of 900 lines/mm at 1550 nm of 1.25 radians/μm.

After dispersion by the combination of the transmissive diffraction grating 212 and reflective surface 216, collimated beams at different wavelengths are directed at different angles back towards the lens 208. Two such beams are shown explicitly and denoted 232 and 232', the latter shown with dashed lines. Since these collimated beams encounter the lens 208 at different angles, they are focused at different points along a line 236 in a transverse focal plane. Line 236 extends in the plane of the top view of FIG. 2A.

The focused beams encounter respective ones of a plurality of retroreflectors 220 located near the focal plane. Each retroreflector 220 sends its intercepted beam along a reverse path that may be displaced in a direction perpendicular to line 224. More specifically, the beams are displaced along respective lines 244 that extend generally parallel to line 236 in the plane of the side view of FIG. 2B and the end view of FIG. 2C. Any suitable retroreflector may be used, some examples of which are described in the '061 application, which has been incorporated by reference. In some embodiments, the displacement of each beam is effected by moving the position of the retroreflector 220 along its respective line 244. In other embodiments, the beam displacement is effected by a reconfiguration of the retroreflector 220. It is noted that the retroreflectors 220 are shown below the output ports 240 in the plane of FIG. 2C, but this is not necessary; other relative positions may occur for different orientations of the grating 212 or other elements.

The beams returning from the retroreflectors 220 are collimated by the lens 208 and directed once more to the transmissive diffraction grating 212. The beams are diffracted by the grating 212, reflected by the reflective surface 216, and diffracted again by the grating 212, in a fashion similar to that described above. These third and fourth encounters with the grating 212 remove the angular separation between the different beams, and direct the collimated beams back to the lens 208, which focuses the beams. As a result of the possible displacement of each beam by its respective retroreflector 220, the beams will be focused at possibly different points along line 236. Thus, depending on the positions of the retroreflectors 220, each beam is directed to one or another of the output ports 240.

In this embodiment, the light traverses the region between the ports and the grating four times, twice in each direction, and encounters the transmissive grating 212 four times. This is to be compared with a similar arrangement in which a reflective grating is substituted for the transmissive grating 212/reflective surface 216 combination, in which the reflective grating would be encountered only twice for a similar fourfold traversal of the arrangement. As a result of the increased dispersion from encountering the transmissive grating 212 four times, various improvements in the design are possible, including shortening the overall length of the wavelength router element 200, increasing the center-center distance required for adjacent channels, and decreasing the clear apertures needed for the lens 208 and the grating 212. Table I provides a comparison of three embodiments, one using a reflective grating and two using a combined transmissive grating and reflective surface in accordance with embodiments of the invention.

TABLE I

| | Reflective Grating | Transmissive Grating + Reflective Surface | Transmissive Grating + Reflective Surface |
|---|---|---|---|
| Line density | 900 lines/mm | 900 lines/mm | 900 lines/mm |
| Lens focal length | ~100 mm | ~50 mm | ~100 mm |
| Wavelength router Length | ~200 mm | ~100 mm | ~200 mm |
| Center-center Distance of Adjacent Channels | ~50 µm | ~50 µm | ~100 µm |
| Lens and Grating Clear Apertures | ~32 mm | ~18 mm | ~34 mm |

In each case, the center-center distance for adjacent channels has been provided for channel separations of about 50 GHz (corresponding to wavelength spacings of about 0.4 nm). The first column shows that with a reflective grating, the overall length of the wavelength router is relatively large and the channel spacing is relatively small. The second column shows an embodiment with a transmissive grating+ reflective surface combination in which, for the same channel spacing as the reflective-grating embodiment, the overall length of the wavelength router is decreased by about a factor of two. This embodiment also permits the use of a lens having a smaller clear aperture. The third column shows an embodiment with a transmissive grating +reflective surface combination in which, instead of decreasing the overall length of the wavelength router permits increasing the channel spacing by about a factor of two.

The embodiment shown in FIGS. 2A–2C is an airspace implementation of a more generic class of what are referred to as free-space embodiments. In some other free-space embodiments, the various beams are all within a body of glass. The term "free-space" refers to the fact that the light within the body is not confined in the dimensions transverse to propagation, but rather can be regarded as diffracting in those transverse dimensions. Since the third and fourth encounters with the dispersive element effectively undo the dispersion induced by the first and second encounters, each spectral band exits the wavelength router with substantially no dispersion.

Figure 3:
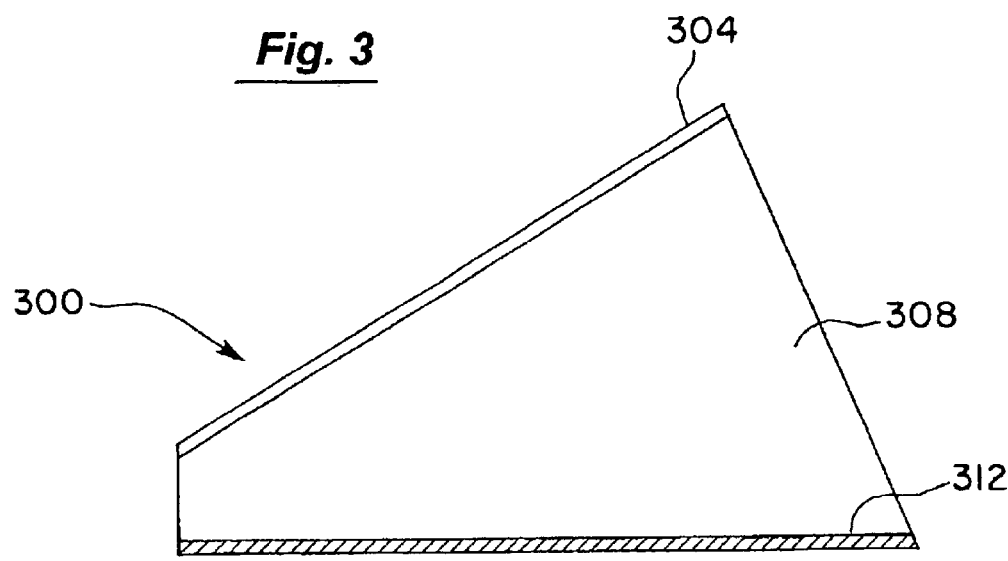
FIG. 3 provides an example of a structure in which a transmissive diffraction grating and reflective surface form an integrated structure.

In other embodiments, various alternatives and/or equivalents to specific elements described in connection with FIGS. 2A–2C may be substituted. For example, the transmissive diffraction grating 212 may be substituted with an alternative transmissive dispersive element, such as a prism. FIG. 3 illustrates the structure of an integrated element 300 that may be substituted for the combination of the transmissive diffraction grating 212 and reflective surface 216. The integrated element 300 retains a similar structure, but uses a prism 308 formed of a material such as glass, to combine a transmissive diffractive element 304 with a solid reflector 312. The integrated element 300 functions in a similar fashion when used in the wavelength router 200 shown in FIGS. 2A–2C, so that the transmissive diffractive element 304 is still encountered four times when a signal is routed.

Figure 4:
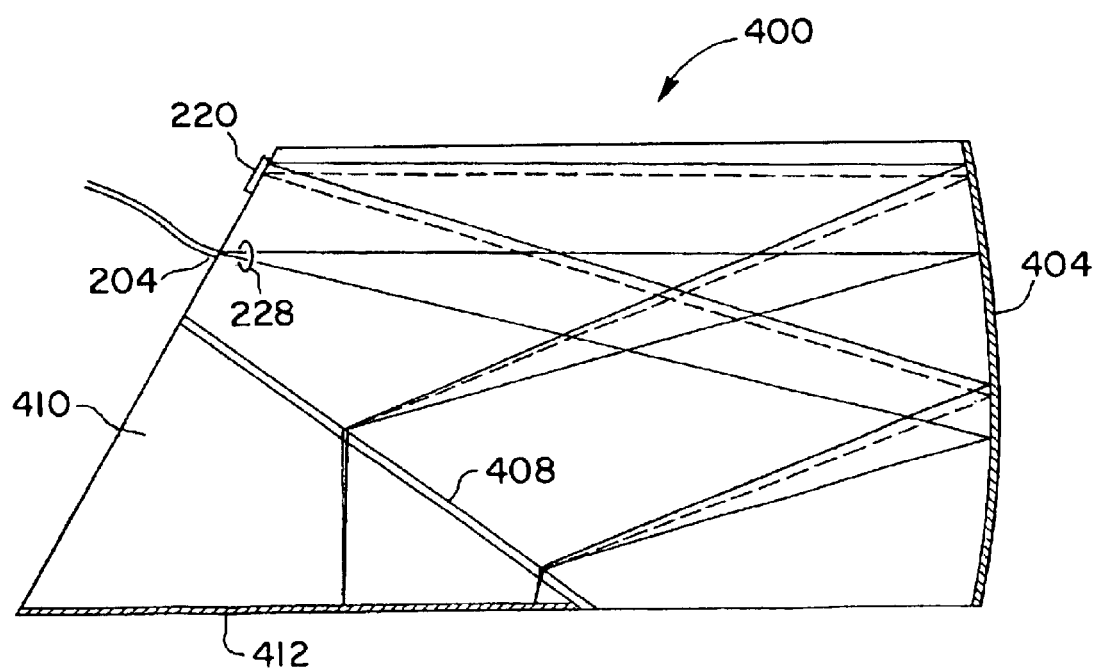
FIG. 4 provides a schematic top view of a wavelength router according to another embodiment of the invention that uses spherical focusing elements.

The integrated element is also suitable for use in other embodiments, such as the solid-glass wavelength router 400 shown schematically in a top view in FIG. 4. This embodiment uses a concave reflector 404 in the place of the lens 208 of FIGS. 2A–2C, and can be considered a folded version of the embodiment of FIGS. 2A–2C. Light entering the wavelength router 400 from the input port 204 forms a diverging beam 228, which includes the different spectral bands. The beam 228 encounters the concave reflector 404, which collimates the light and directs it to the integrated element 410 comprised as part of the wavelength router 400. The transmissive grating 408 formed as part of the integrated element 410 is encountered twice by the light, before and after it reflects from the reflective surface 412. After encountering the transmissive grating 408 twice, the light is dispersed so that collimated beams at different wavelengths are directed back at different angles towards the concave reflector 404. Two such beams are shown explicitly, one in solid lines and one in dashed lines. Since these collimated beams encounter the concave reflector 404 at different angles, they are focused at different points in a transverse focal plane.

The focused beams encounter retroreflectors 220 located near the focal plane. The operation in the reverse direction is similar to that described with respect to FIGS. 2A–2C. The beams follow reverse paths displaced in a direction orthogonal to the plane of FIG. 4, and are therefore not visible in the figure since they underlie the forward paths. On the return paths, the beams encounter, in order, the concave reflector 404, the transmissive grating 408, the reflective surface 412, the transmissive grating 408, and the concave reflector 404. The two encounters with the transmissive grating 408 remove the dispersion in the beams and the final encounter with the concave reflector 404 focuses the beams to the desired output ports 240 (also not shown in FIG. 4 since they underlie the input port 204).

4. Embodiments Using Cylindrical Focusing Elements

Figure 5A:
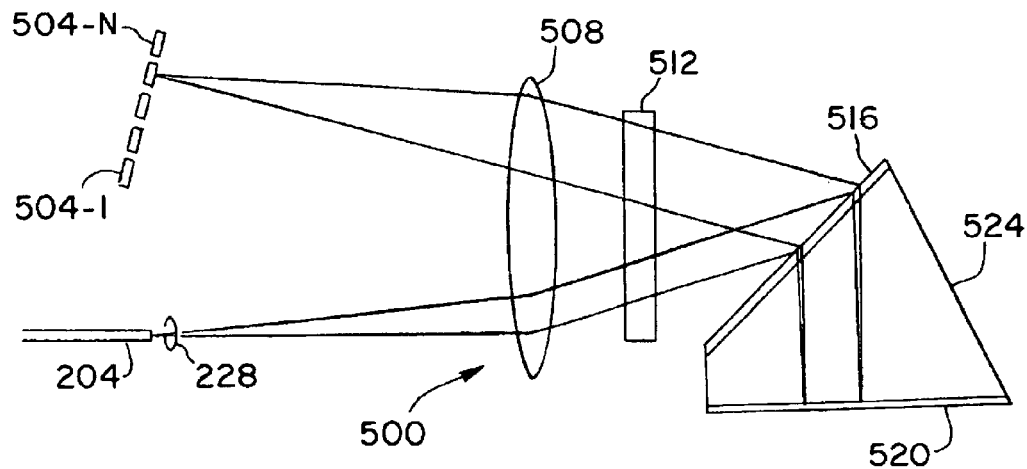
FIGS. 5A and 5B provide schematic top and side views, respectively, of a wavelength router according to another embodiment of the invention that uses cylindrical focusing elements.
Figure 5B:
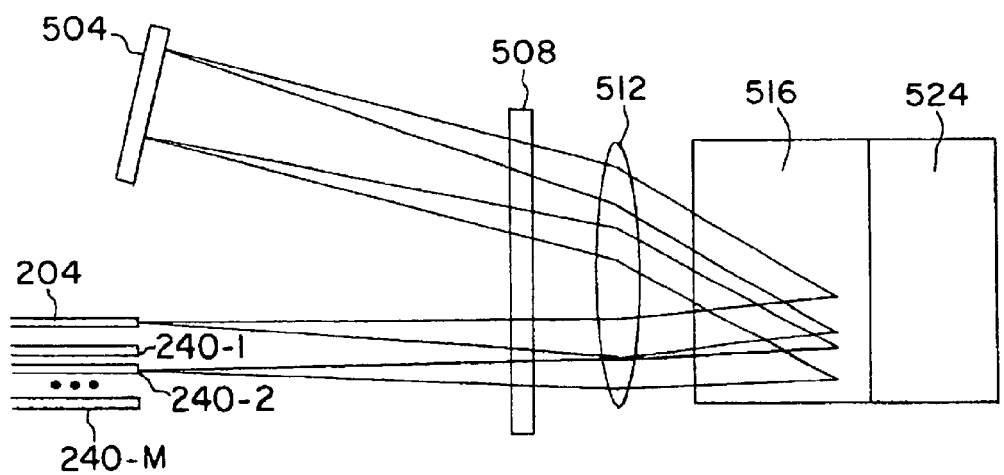

FIGS. 5A and 5B are schematic top and side views, respectively, of a wavelength router 500 according to an embodiment of the invention. This embodiment uses cylindrical lenses rather than spherical lenses, uses tiltable mirrors rather than retroreflectors, and uses an integrated element 524 that includes a transmissive diffraction grating 516 and a reflective surface 520. The general functionality of wavelength router 500 is the same as the wavelength router 200 shown in and described with respect to FIGS. 2A–2C, namely to accept light having a plurality of spectral bands at the input port 204, and selectively to direct subsets of the spectral bands to desired ones of the plurality of output ports 240.

A first cylindrical lens 508 has refractive power only in the plane of the top view (FIG. 5A), and a second cylindrical lens 512 has refractive power only in the plane of the side view (FIG. 5B). As such, the first lens 508 is drawn as a rectangle in the plane of FIG. 5B and the second lens 512 is drawn as a rectangle in the plane of FIG. 5A. Light entering the wavelength router 500 from the input port 204 forms a diverging beam 228, which includes the different spectral bands. The beam 228 encounters the first cylindrical lens 508, which collimates the light in one transverse dimension, but not the other, so that the beam has a transverse cross section that changes from circular to elliptical, i.e. the beam 228 continues to expand in the plane of FIG. 5B but not in the plane of FIG. 5A.

The beam 228 then encounters, in order, the second cylindrical lens 512, the integrated element 524, and the second cylindrical lens 512 again. The two encounters with the second cylindrical lens 512 collimate the light that is diverging in the plane of FIG. 5B so that the beam propagates with a constant elliptical cross section. The integrated element 524 uses the principles discussed above, using the combination of transmissive diffraction grating 516 and reflective surface 520 comprised by the integrated element 524, to disperse the light in the plane of FIG. 5A. Accordingly, beams at different wavelengths are transmitted at different angles in the plane of FIG. 5A, but not in the plane of FIG. 5B.

The collimated beams encounter the first cylindrical lens 508 and are focused to respective lines. The focused beams encounter respective ones of a plurality of tiltable micromirrors 504 located near the focal plane. Various examples of micromirror configurations that may be used, among others, are described in the following copending, commonly assigned applications, each of which is herein incorporated by reference in its entirety for all purposes: U.S. pat. appl. Ser. No. 09/898,988, entitled "SYSTEMS AND METHODS FOR OVERCOMING STICTION USING A LEVER," filed Jul. 3, 2001 by Bevan Staple et al.; U.S. pat. appl. Ser. No. 09/899,000, entitled "FREE-SPACE OPTICAL WAVELENGTH ROUTER BASED ON STEPWISE CONTROLLED TILTING MIRRORS," filed Jul. 3, 2001 by Victor Buzzetta et al.; U.S. pat. appl. Ser. No. 09/899,001, entitled "TWO-DIMENSIONAL FREE-SPACE OPTICAL WAVELENGTH ROUTER BASED ON STEPWISE CONTROLLED TILTING MIRRORS," filed Jul. 3, 2001 by Victor Buzzetta; U.S. pat. appl. Ser. No. 09/899,002, entitled "MEMS-BASED, NONCONTACTING, FREE-SPACE OPTICAL SWITCH," filed Jul. 3, 2001 by Bevan Staple and Richard Roth; U.S. pat. appl. Ser. No. 09/899,004, entitled "BISTABLE MICROMIRROR WITH CONTACTLESS STOPS," filed Jul. 3, 2001 by Lilac Muller; U.S. pat. appl. Ser. No. 09/899,014, entitled "METHODS AND APPARATUS FOR PROVIDING A MULTI-STOP MICROMIRROR," filed Jul. 3, 2001 by David Paul Anderson; and U.S. pat. appl. Ser. No. 09/941,998, entitled "MULTIMIRROR STACK FOR VERTICAL INTEGRATION OF MEMS DEVICES IN TWO-POSITION RETROREFLECTORS," filed Aug. 28, 2001 by Frederick Kent Copeland.

After encountering the tiltable micromirrors 504, the beams are directed back to the first cylindrical lens 508, diverging only in the plane of FIG. 5A. Depending on the tilt angles of the respective micromirrors 504, the beams are angularly displaced in the plane of FIG. 5B. The return beams undergo different transformations in the planes of FIGS. 5A and 5B.

In the plane of 5A, the beams are collimated by the first cylindrical lens 508, and directed again to the integrated element 524. In this plane, encounters with the second cylindrical lens 512 do not change the collimated character of the beams. The integrated element 524 removes the angular separation between the different beams as a result of two encounters with the transmissive diffraction grating 516 and a reflection from the reflective surface 520. The collimated beams are thus directed back to the first cylindrical lens 508, which focuses the beams in the plane of FIG. 5A at the output ports 240. In FIG. 5A, the return beams are not shown separately, but rather have projections in the plane that coincide with the projection of the forward beam.

In the plane of FIG. 5B, the return beams are focused by the two encounters with the second cylindrical lens 512 onto the output ports 240. Because of possible angular displacement of each beam by its respective micromirror 504, the beams are directed to one or another of the output ports 240. In FIG. 5B, neither the first cylindrical lens 508 nor the integrated element 524 affects whether the beams are diverging, collimated, or converging. The second cylindrical lens 512 provides a Fourier relation in the plane of the side view that maps tilted wave fronts at the micromirrors 504 to displaced positions at the output ports 240.

5. Embodiments with Combined Focusing and Dispersion

Figure 6A:
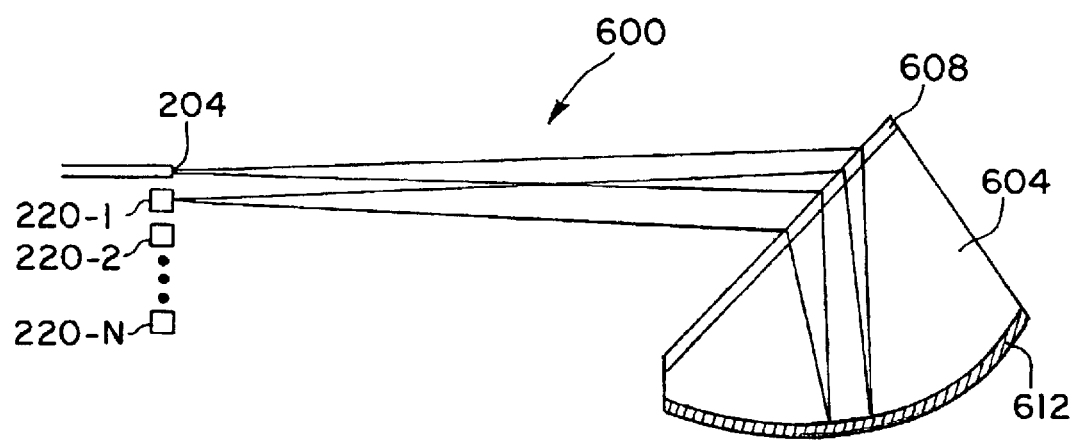
FIGS. 6A and 6B provide schematic top and side views, respectively, of a wavelength router according to another embodiment of the invention in which an integrated element provides both dispersion and optical power.
Figure 6B:
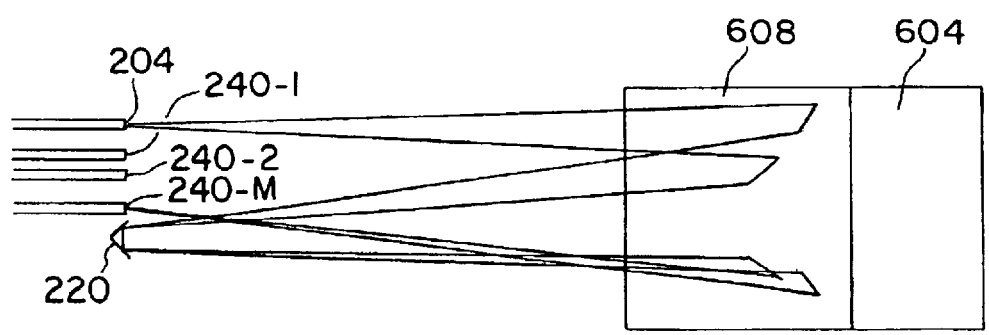

In alternative embodiments, the integrated element combines dispersion and optical power. For example, FIGS. 6A and 6B illustrate a wavelength router 600 according to an embodiment of the invention in which the integrated element 604 comprises a curved reflective surface 612 instead of a flat reflective surface. Within the integrated element, dispersion is provided by a transmissive diffraction grating 608 while optical power is provided by the curvature of the reflective surface 612. The wavelength router 600 otherwise functions in a manner similar to that described with respect to FIGS. 2A–2C, with the transmissive dispersive element being encounter four times in a given pass through the router 600. While the figures illustrate an embodiment with an integrated element 604, it will be understood that the integrated element 604 may be substituted by a discrete transmissive diffractive element and curved reflective surface.

6. Efficiency Considerations

The efficiency $\epsilon$ and polarization-dependent loss ("PDL") of the transmissive dispersive elements used in various embodiments of the wavelength router affect optical signals with each encounter of the grating. The PDL accumulates additively so that four encounters results in a total PDL due to the dispersive element equal to $4 \times PDL^{(o)}$. The efficiency accumulates multiplicatively so that four encounters result in efficiencies of $\epsilon_P^4$ and $\epsilon_S^4$ respectively in the orthogonal polarization states P and S. Transmission gratings having an efficiency exceeding 95% in both P and S polarizations at wavelengths of 1530–1565 nm have been reported in "Dense wavelength division multiplexing (DWDM) and the Dickson grating" by R. D. Rallison, January 2001, the entire disclosure of which is herein incorporated by reference for all purposes. Accordingly, use of a transmission grating having such an efficiency limits the grating losses of the wavelength router to less than 20% and a PDL less than 0.5 dB.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A wavelength router for receiving, at an input port, light having a plurality of spectral bands and directing subsets of the spectral bands to respective ones of a plurality of output ports, the wavelength router comprising:

a free-space optical train disposed between the input port and the output ports providing optical paths for routing the spectral bands, the optical train including a transmissive dispersive element disposed to intercept light traveling from the input port, the optical train being configured so that light encounters the transmissive dispersive element at least four times before reaching any of the output ports.

2. The wavelength router recited in claim 1 further comprising a routing mechanism having at least one dynamically configurable routing element to direct a given spectral band to different output ports depending on a state of the dynamically configurable element.

3. The wavelength router recited in claim 2 wherein the dynamically configurable element comprises has a translational degree of freedom.

4. The wavelength router recited in claim 2 wherein the dynamically configurable element has a rotational degree of freedom.

5. The wavelength router recited in claim 2 wherein the routing mechanism has a configuration that directs at least two spectral bands to a single port.

6. The wavelength router recited in claim 2 wherein the routing mechanism has a configuration that results in at least one output port receiving no spectral bands.

7. The wavelength router recited in claim 2 wherein the routing mechanism includes a plurality of reflecting elements, each associated with a respective one of the spectral bands.

8. The wavelength router recited in claim 2 wherein:

the optical train further includes a lens;

the routing mechanism includes a plurality of dynamically configurable elements;

light coming from the input port is collimated by the lens, dispersed by passing twice through the transmissive dispersive element as a plurality of angularly separated beams corresponding to the spectral bands;

the angularly separated beams are focused by the lens on respective ones of the dynamically configurable elements; and each dynamically configurable element has a plurality of states, each adapted to direct that dynamically configurable element's respective angularly separated beam along a desired one of a plurality of paths such that light leaving that dynamically configurable element is again collimated by the lens, passes twice through the transmissive dispersive element, and again focused by the lens on one of the output ports corresponding to the desired one of the plurality of paths.

9. The wavelength router recited in claim 1 wherein the input port is located at the end of an input fiber.

10. The wavelength router recited in claim 1 wherein the plurality of output ports are located at respective ends of a plurality of output fibers.

11. The wavelength router recited in claim 1 wherein the number of spectral bands is greater than the number of output ports.

12. The wavelength router recited in claim 1 wherein the transmissive dispersive element comprises a transmissive diffraction grating.

13. The wavelength router recited in claim 1 wherein the optical train further includes a reflective surface disposed to redirect light transmitted through the transmissive dispersive element back towards the transmissive dispersive element.

14. The wavelength router recited in claim 13 wherein the reflective surface is substantially flat.

15. The wavelength router recited in claim 13 wherein the reflective surface comprises optical power.

16. The wavelength router recited in claim 13 wherein the transmissive dispersive element and the reflective surface are comprised by an integrated element.

17. The wavelength router recited in claim 1 wherein the optical train further includes a curved reflector disposed to intercept light from the input port, collimate the intercepted light, direct the collimated light toward the transmissive dispersive element, intercept light after it has passed twice through the transmissive dispersive element, focus the light, and direct the focused light along a path, with each spectral band being focused at a different point.

18. The wavelength router recited in claim 17 wherein the optical train further includes a plurality of reflecting elements disposed to intercept the respective focused spectral bands to direct such respective focused spectral bands so as to encounter the curved reflector, pass through the transmissive dispersive element twice, again encounter the curved reflector, and encounter the respective output ports.

19. The wavelength router recited in claim 1 wherein:

the optical train further includes a first cylindrical lens for collimating light emanating from the input port in a first transverse dimension and a second cylindrical lens for collimating the light in a second transverse dimension that is orthogonal to the first transverse dimension; and the transmissive dispersive element is configured to disperse the light in the first transverse dimension.

20. The wavelength router recited in claim 19 further comprising a plurality of tiltable micromirrors in a focal plane of the first cylindrical lens, each such tiltable micromirror configured for intercepting a respective spectral band and directing that spectral band back toward the first cylindrical lens, wherein each spectral band is collimated in the first transverse dimension by passing twice through the transmissive dispersive element, focused in the second transverse dimension by the second cylindrical lens, and focused in the first transverse dimension by the first cylindrical lens, whereupon each spectral band is brought to a focus in both the first and second transverse dimensions at a respective position determined by the respective tiltable micromirror.

21. A method for routing light having a plurality of spectral bands, the method comprising:

receiving the light at an input port; and directing the light along optical paths configured to route a subset of the spectral bands to respective ones of a plurality of output ports, each such optical path including propagation at least four times through a transmissive dispersive element.

22. The method recited in claim 21 wherein directing the light comprises steering each of the subset of the spectral bands to different output ports depending on a state of a respective dynamically configurable routing element.

23. The method recited in claim 22 wherein directing the light comprises:
collimating the light from the input port;
dispersing the collimated light by directing it twice through the transmissive dispersive element as a plurality of angularly separated beams corresponding to the spectral bands; and
focusing the angularly separated beams on respective ones of the dynamically configurable elements.

24. The method recited in claim 23 wherein steering each of the subset of the spectral bands comprises:
collimating light leaving the respective dynamically configurable routing element;
propagating the collimated light twice through the transmissive dispersive element to be focused on one of the output ports.

25. The method recited in claim 21 wherein the transmissive dispersive element comprises a transmissive diffraction grating.

26. The method recited in claim 21 wherein directing the light comprises reflecting light transmitted through the transmissive dispersive element back towards the transmissive dispersive element.

27. The method recited in claim 21 wherein directing the light comprises:
collimating the light from the input port in a first transverse dimension;
collimating the light in a second transverse dimension that is orthogonal to the first transverse dimension; and
dispersing the light in the first transverse dimension with the transmissive dispersive element.

28. A wavelength router comprising:
means for receiving light having a plurality of spectral bands;
means for directing the light along optical paths configured to route a subset of the spectral bands to respective ones of a plurality of output ports, each such optical path including propagation at least four times through a transmissive light-dispersing means.

29. The wavelength router recited in claim 28 wherein the means for directing the light comprises means for steering each of the subset of the spectral bands to different output ports depending on a state of a respective dynamically configurable routing means.

30. The wavelength router recited in claim 29 wherein the means for directing the light comprises:
means for collimating the received light;
means for dispersing the collimated light by directing it twice through the transmissive light-dispersive means as a plurality of angularly separated beams corresponding to the spectral bands; and
means for focusing the angularly separated beams on respective ones of the dynamically configurable routing means.

31. The wavelength router recited in claim 30 wherein the means for steering comprises:
means for collimating light leaving the respective dynamically configurable routing means; and
means for propagating the collimated light twice through the transmissive light-dispersing means.

32. The wavelength router recited in claim 28 wherein the means for directing the light comprises means for reflecting light transmitted through the transmissive light-dispersing means back towards the transmissive light-dispersing means.

* * * * *